United States Patent [19]

Suda et al.

[11] 3,920,739
[45] Nov. 18, 1975

[54] PROCESS FOR THE PRODUCTION OF AROMATIC DIAMINES

[75] Inventors: Hideaki Suda, Takaishi; Tatsuo Kanda; Hiroshige Tomita, both of Toyonaka; Hirotoshi Nakanishi, Minoo; Hiromu Hida, Minoo; Tatsumi Nuno, Minoo, all of Japan

[73] Assignee: Sumitomo Chemical Company, Limited, Osaka, Japan

[22] Filed: July 11, 1973

[21] Appl. No.: 378,059

[30] Foreign Application Priority Data

Feb. 13, 1973 Japan.............................. 48-18191

[52] U.S. Cl............. 260/556 A; 260/573; 260/574; 260/575; 260/577; 260/578; 260/580; 260/612 R; 260/612 D; 260/613 R; 260/613 D; 260/622 R
[51] Int. Cl.²..................................... C07C 143/74
[58] Field of Search............ 260/556 A, 556 R, 573, 260/577, 580, 612 D, 574

[56] References Cited
UNITED STATES PATENTS

| | | | |
|---|---|---|---|
| 3,320,286 | 5/1967 | Franko-Filipasic | 260/612 D |
| 3,337,525 | 8/1967 | Peters et al. | 260/573 |
| 3,666,813 | 5/1972 | Hindin et al. | 260/580 |
| 3,803,054 | 4/1974 | Habig et al. | 260/580 |
| 3,819,708 | 6/1974 | Manning | 260/573 |
| 3,825,602 | 7/1974 | Pallos et al. | 260/612 D |

*Primary Examiner*—Sherman D. Winters
*Attorney, Agent, or Firm*—Wenderoth, Lind & Ponack

[57] ABSTRACT

A process for the preparation of a diamino compound of the formula (I),

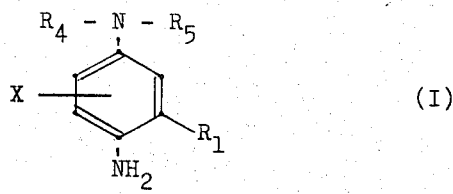

wherein $R_1$ is hydrogen atom or a straight or branched $C_1 - C_6$ alkyl group, $R_4$ and $R_5$ are each a $C_1 - C_6$ alkyl group unsubstituted or substituted by hydroxy group, a lower alkoxy group or a sulfonylamide group, and X is hydrogen atom, chlorine atom, bromine atom, a lower alkyl group or a lower alkoxy group, which is useful as intermediate for the production of dyes, pigments, medicines and pesticides, as well as a developing agent for a color photograph.

20 Claims, No Drawings

PROCESS FOR THE PRODUCTION OF AROMATIC DIAMINES

The present invention relates to a method for preparing a derivative of p-phenylenediamine.

The p-phenylenediamine derivatives of the present invention represented by the general formula,

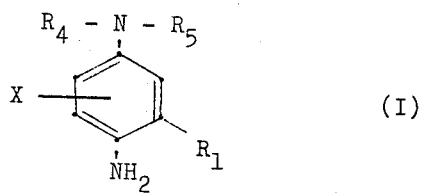

wherein $R_1$ is hydrogen atom or a straight or branched $C_1 - C_6$ alkyl group, each $R_4$ and $R_5$ is a $C_1 - C_6$ alkyl group unsubstituted or substituted by hydroxy group, a lower alkoxy group or a sulfonylamide group, and X is hydrogen atom, chlorine atom, bromine atom or a lower alkyl group or an alkoxy group, are widely used not only for a useful intermediate for dyestuffs, pigments, medicines and pesticides, but also for a developing agent for color photograph which have caused an increasing demand of the compounds. The compounds of formula (I) have been obtained by a well known method comprising, for example, the nitration of alkylbenzenes followed by reduction to produce m-aminoalkylbenzenes, the dialkylation of the resulting compound to produce tertiary amine compounds of the formula,

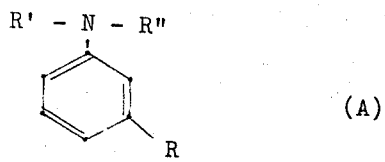

wherein R is a lower alkyl group, and R' and R'' are each a lower alkyl group which may be substituted, and subjecting the compounds of formula (A) to the following reaction processes.

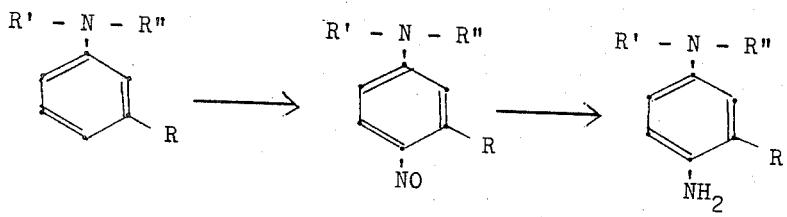

The inventors, as a result of extensive studies on the reaction processes, have found that the processes are very disadvantageously carried out in an industrial scale as shown hereinafter.

1. The m-nitroalkylbenzene which is a starting material of the m-aminoalkylbenzene is very difficultly available. For example, nitration of toluene gives only m-nitrotoluene in a yield of 3 % at best, and furthermore separation of the nitrotoluene is very difficult.

2. Nitrosoration of the compounds of formula (A) readily causes an abnormal reaction, resulting in a decrease in the yield and purity of the products, and a danger of explosion. In addition, the resulting nitroso compounds are very instable and very difficult to be handled.

3. The nitroso compounds should be reduced under a very mild condition due to their instability, resulting in an increase in the cost of reducing agents and catalysts.

Furthermore, instability of the nitroso compounds often causes a decrease in the yield and purity of the reduction products.

The inventors have studied on a new synthetic method of the compounds of formula (I), and discovered a very superior process to solve all the disadvantages (1), (2) and (3) of the conventional one, to produce an aimed product in a high yield and purity and to make easy its industrial application.

The present invention is to provide a process for the preparation of a diamino compound of the formula (I),

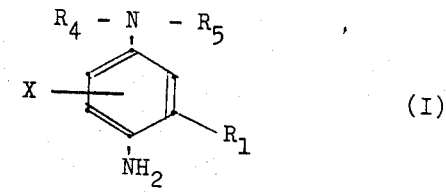

wherein $R_1$ is hydrogen atom or a straight or branched $C_1 - C_6$ alkyl group, $R_4$ and $R_5$ are each a $C_1 - C_6$ alkyl group unsubstituted or substituted by hydroxy group, a lower alkoxy group or a sulfonylamide group, and X is hydrogen atom, chlorine atom, bromine atom, a lower alkyl group or a lower alkoxy group, which comprises (1) reacting a nitrophenol compound of the formula (V),

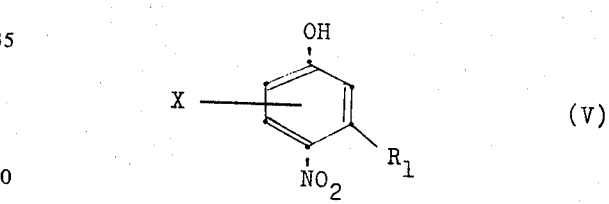

wherein $R_1$ and X are as defined above, with a chloride compound of the formula,

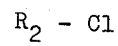

$$R_2 - Cl$$

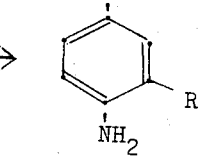

wherein $R_2$ is an alkyl group or an aralkyl group, to prepare a nitroether compound of the formula (IV),

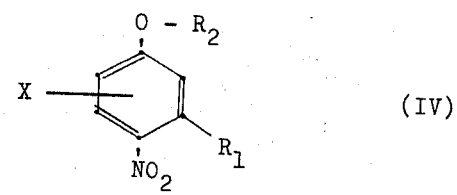

wherein $R_1$, $R_2$ and X are as defined above, (2)a) reacting the nitroether compound (IV) with ammonia or an aliphatic primary amine to prepare a nitro compound of the formula (III),

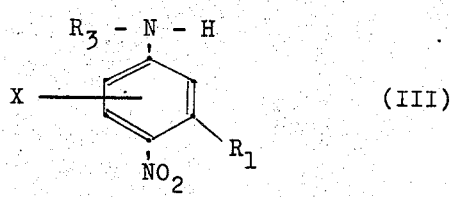

wherein $R_1$ and X are as defined above, and $R_3$ is hydrogen atom, an unsubstituted or substituted alkyl group, and successively reacting the nitro compound (III) with an alkylating agent to prepare a nitroamine compound of the formula (II),

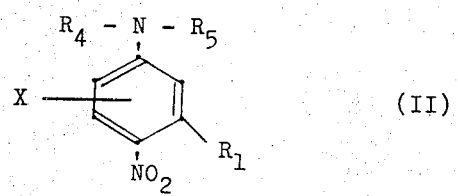

wherein $R_1$, $R_4$, $R_5$ and X are as defined above, or (b) reacting the nitroether compound (IV) with an aliphatic secondary amine to prepare the nitroamine compound (II), and (3) reducing the nitroamine compound (II) to prepare the diamino compound (I).

The compounds represented by the formulae (II), (III) and (IV) include novel compounds. The novel compounds are represented by the formula,

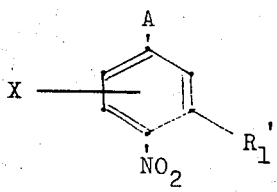

wherein A is —O—$R_2$ or

in which $R_2$ and $R_3$ are as defined above, and $R_9$ is hydrogen atom, a $C_1$ - $C_6$ alkyl group unsubstituted or substituted by hydroxy group, an alkoxy group or a sulfonylamide group, $R_1'$ is a straight or branched $C_1$ - $C_6$ alkyl group, and X is as defined above.

In the present invention, the term "alkyl" is intended to mean an alkyl having 1 to 6 carbon atoms, unless otherwise specified, the "alkoxy" is one having 1 to 3 carbon atoms, and the "sulfonylamide" is represented by the formula, —NHSO$_2$—$R_{10}$, in which $R_{10}$ is an alkyl group having 1 to 3 carbon atoms.

The reaction processes of the present invention will be illustrated hereinafter in more details.

A. In a first embodiment of the method, the nitroethers (IV) are prepared from the nitrophenols (V) and a chloride compound. As is well known, the nitroethers (IV) are very important in industry, for example, they are very useful intermediates for dyestuffs, pigments, perfume, medicines and the like. They have been prepared by a conventional method comprising reacting nitrophenols with alkyliodides or alkylbromides in the presence of a base, or reacting the nitrophenols with alkylsulfonic acids in the presence of a base.

In those processes, as can be seen from the above, the former process disadvantageously requires very expensive materials such as iodides or bromides, and the latter also requires highly toxic materials and discharges a large amount of waste water which is difficult to be treated.

The inventors, as a result of the study on O-alkylation of the nitrophenols, have discovered a useful method as described above.

The method of the present invention which is not known in the art is characterized in that chlorides are used as an O-alkylating agent for the nitrophenols. The use of the chlorides makes it possible to overcome all the disadvantages as above mentioned and prepare the aimed nitroether derivatives in a low cost and high yield by a simple industrial operation.

B. In a second embodiment of the method, the nitroamine compounds (II) and nitro compounds (III) are obtained by reacting the nitroether compounds (IV) with ammonia, primary or secondary aliphatic amine, or derivatives thereof.

The compounds of formula (II) or (III) are very useful intermediates for dyestuffs, pigments, pesticides and medicines. When the compounds are derived from m-toluidine derivatives by nitration, it was found that the derivatives should be limitedly employed to prevent side reactions and in the extreme case they can not give aimed products at all, because the nitration hardly takes place selectively in a para-position to the amino group thereof, resulting in a decrease in yield and a difficult separation of aimed products from by-products.

The inventors have found that the compounds of formula (II) or (III) can easily be prepared by the reaction between the compounds of formula (IV) and an amine. According to the method of the invention, nitro isomers need not be isolated because a nitration process is not included therein, and in addition aimed products can very easily be separated, even if they have a high boiling point and are very difficult to be solidified, from the reaction system which comprises only a few components, e.g., the compound of formula (IV), an amine, and the aimed product of formula (II) or (III) because side reactions hardly occur. Furthermore, the method can give the compounds of formula (II) in an average yield of above 90 %, and especially in a substantially quantitative yield when $R_1$, $R_2$, $R_3$, $R_4$ and $R_5$ are appropriately selected.

C. In a third embodiment of the method, the compounds of formula (II) are prepared by alkylating the compounds of formula (III). The inventors have tried to obtain the compound of formula (II) by nitrating N-substituted or N,N-disubstituted m-toluidine compounds, and found, as is well known to those skilled in the art, that remarkable amounts of undesirable isomers are always produced, which are very difficult to be removed, even if the reaction condition may be strictly controlled to minimize the formation of the isomers.

However, according to the method of the invention, the separation of the aimed product from the reaction mixture is very easy compared with the nitration process, because the isomers are never produced and the reaction system after completion of the reaction is much simplified.

Furthermore, there is no danger that an abnormal reaction and an explosion occur, since the process is carried out under a mild condition. Still furthermore, the compounds of formula (II) can be obtained in a very high yield compared with the nitration process in which expensive N-substituted or N,N-disubstituted m-toluidines are wasted by the formation of isomers and the separation of the desired product from the isomers. Therefore the process of the invention can be said very desirable for an industrial application.

D. In a fourth embodiment of the method, nitroamine derivatives are prepared by a new alkylation process. The process is a novel method for the preparation of the compounds of the formula (II'),

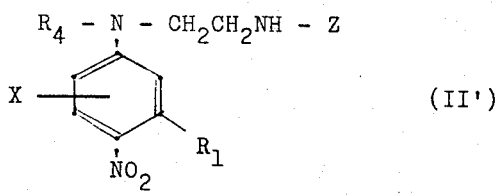

wherein $R_1$, $R_4$ and X are the same as defined above, and Z is an alkylsulfonyl group.

The inventors have tried to prepare the compounds of formula (II') by nitrating m-toluidine derivatives of the formula (VII),

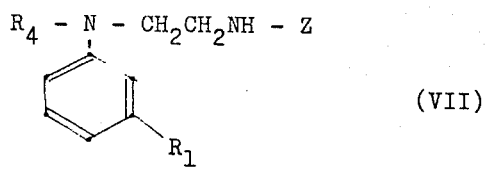

wherein Z, $R_1$ and $R_4$ are the same as defined above, however found that the nitration process gives a considerable amount of isomers which causes a decrease in yield and a difficulty of separation.

The inventors have developed a new process which comprises reacting the compounds of formula,

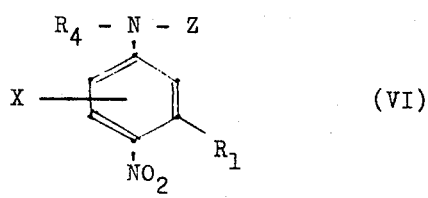

wherein $R_1$, $R_4$, X and Z are the same as defined above, with monoethanolamine to obtain the compounds of formula (II').

According to the process of the present invention, there is provided an industrial process wherein the compounds of formula (II') can advantageously be prepared by a simple operation in a high yield, and in addition under a mild condition whereby there is no danger of an abnormal reaction and explosion which are often encountered in the nitration process.

E. In a fifth embodiment of the method, there is provided an effective separation of a compound having a sulfonylaminoalkyl group connected to an amino group thereof from a compound having no sulfonyl aminoalkyl group.

More particularly, the invention provides a process for separating the compounds of formula (II) wherein any one of $R_4$ or $R_5$ is a sulfonylamidoalkyl group and the compounds of formula (III) wherein $R_3$ is not a sulfonamidoalkyl group characterized in that the mixture containing them is treated with inorganic or organic bases to form an adduct between the compounds of formula (II) and bases, which is isolated from the other compounds.

When the compounds of formula (III) are subjected to sulfonylamidoalkylation, the resulting reaction mixture always contains the compounds of formula (II) and (III). The compounds of formula (II) may be separated from the mixture by a recrystallization method which certain degree of yield and purity, however this method is very disadvantageous in industry, especially when a high purity product is to be obtained by repeated recrystallizations which result in a decrease in yield and a prolonged operation.

The inventors have completed a separation process much superior to the conventional one, on the base of the finding that, when inorganic or organic bases are added to a mixture of the compounds of formula (II) and (III), the compounds (II) selectively form an adduct with the bases, which can easily be separated from the compounds (III) by a simple operation.

F. In a sixth embodiment of the method diamino compounds of formula (I) are prepared by the reduction of nitroamino compounds (II).

According to the conventional method, the compounds of formula (I) is prepared by the reduction of the corresponding nitrosoaniline derivatives. A nitroso compound is generally very unstable, and has a danger of explosion during the preparation procedure or storage, and especially in an industrial scale the danger becomes very large and, in addition, a foreknowledge of explosion is impossible. And the unstability deteriorates the quality of the compounds of formula (I) under any strictly controlled conditions, decreases the yield, and causes a contamination of undesired compounds.

Furthermore, in case where the compounds (I) is prepared from the unstable nitroso compounds, a very mild catalytic hydrogenation must be carried out and therefore a large amount of an expensive metal catalyst should be used and in addition the activity of the catalyst is easily deteriorated due to the unstability of the nitroso compounds. The inventors have succeeded in overcoming the disadvantages by applying a catalytic hydrogenation to the compounds of formula (II) which are much more stable than the nitroso compounds.

According to the present process, there is no danger of explosion at all, and no reduction in yield and no contamination of undesirable compounds due to the stability of the compounds of formula (II). In addition, the hydrogenation may be carried out under much more severe condition than in the nitroso compound, resulting in less amount of catalyst used and no deterioration of catalyst.

Referring not to the embodiments of the present invention in details.

A. In the first embodiment of the invention, the compounds of formula (IV) are prepared by reacting the compounds of formula (V) with a chloride compound in the presence of a base.

The compounds of formula (V) which is a starting material include 3-methyl-4-nitrophenol, 3,5-dimethyl-4-nitrophenol, 3-ethyl-4-nitrophenol, 3-isopropyl-4-nitrophenol, 3-methyl-4-nitro-5-isopropylphenol, 3-tert.-butyl-4-nitrophenol, 3-methyl-4-nitro-5-methoxyphenol, and 3-methyl-4-nitro-5-chlorophenol. The above 4-nitrophenol derivatives can be prepared from corresponding phenols which have no substituent at a 4-position thereof, by nitration of the phosphate thereof followed by hydrolysis.

The chloride compounds are represented by the formula $R_2$—Cl, wherein $R_2$ is as defined above, and for example, include methyl or ethylchloride, n- or iso-propylchloride, n-, sec- or tert.-butylchloride, n-hexylchloride and benzylchloride. In the reaction, the compounds of formula (V) and the chlorides are each used in a stoichiometric amount, however the latter is generally used in a small excess of that theoretically required.

The solvents usually used as a reaction medium include water, methanol, ethanol, isopropylalcohol, hexanols, glycols such as ethyleneglycol, esters of glycols, methyl or ethylcellosolve, dioxane, dimethylsulfoxide, N,N-dimethylformamide and a mixture thereof. In addition, the chlorides themselves are also used as a solvent. The amount of the solvent used is 1 to 20 times by weight based on the compounds (V), and preferably 1 to 5 times by weight.

The bases include alkali metals, alkali metal hydroxides, alkali metal carbonates, alkali metal alkoxylates, alkaline earthmetal hydroxides, and teriary amines. The amount of the base used is generally stoichiometric to the starting material, and preferably in a small excess.

The reaction temperature is 50° to 250°C., preferably 100° to 150°C., and the reaction pressure is an atmospheric pressure to 20 kg./cm².

From the reaction mixture thus obtained, the compounds of formula (IV) can be obtained in a high yield by filtration, separation of two liquid layers or distillation.

B. In the second embodiment of the invention, the compounds of formula (II) or (III) can be obtained by reacting the compounds of formula (IV) with ammonia or an aliphatic primary amine of the formula, $R_6$—$NH_2$, wherein $R_6$ is an alkyl group unsubstituted or substituted by hydroxy group, a lower alkoxy group or a sulfonylamide group, or an aliphatic secondary amine of the formula, $R_7$—NH—$R_8$, wherein $R_7$ and $R_8$ are each an alkyl group unsubstituted or substituted by hydroxy group, a lower alkoxy group or a sulfonylamide group.

Examples of the amines include ethylamines, β-hydroxyethylamines, β-alkoxyethylamines and β-methylsulfonylaminoethylamine.

Alkyl groups in the compounds of formula (II) or (III) include methyl, ethyl, n- or iso-propyl, n-, sec, or tert.-butyl, pentyls, hexyls, β-hydroxyethyl, β-methylsulfonylaminoethyl, β-methoxyethyl and β-ethoxyethyl groups.

These aliphatic amines or ammonia are generally used in an amount of 1.05 to 50 moles, preferably 1.20 to 10 moles, per mole of the compounds of formula (IV).

The reaction temperature is usually 30° to 300°C., preferably 150° to 200°C., and the reaction pressure is usually an atmospheric pressure to 100 kg./cm.², preferably an atmospheric pressure to 50 kg./cm².

The reaction may be carried out in the presence or absence of a solvent, and as the solvent, the same solvent as in the preparation of the compounds of formula (V) from the compounds of formula (IV) is used.

In the reaction, the use of bases other than ammonia and the aliphatic amine allows the reaction to proceed at a relatively low temperature, low pressure and with an increased yield.

The bases include hydroxides or oxides of alkali or alkaline earth metal such as lithium hydroxide, sodium hydroxide, potassium hydroxide, and calcium (or barium) hydroxide or oxide; alkoxides or phenoxides of alkali metal such as sodium methylate (or ethylate), potassium methylate (or ethylate) and sodium or potassium phenoxide; hydroxides of quarternary amine such as benzyl trimethylammonium hydroxide; and tertiary amines such as N,N-dimethyl (or diethyl) aniline, triethylamine and pyridines.

The amount of base used is 0.01 to 30 percent by weight based on the compounds of formula (IV), preferably 0.1 to 10 percent by weight.

The reaction temperature can be set about 50°C. lower than that in the absence of the base and consequently the reaction pressure can be also reduced largely. In addition the reaction time can be also reduced to a half to one-third, and consequently side reactions difficulty occur resulting in an increase in yield. And in the reaction between the compounds of formula (IV) and (VIII), ethyl group as $R_2$ in the formula (IV) is especially preferable, because a less side reaction and a higher yield are resulted in.

C. In the third embodiment of the invention, the resulting compounds of formula (III) are to be converted into the compounds of formula (II) with an alkylating agent including alkyleneoxides such as ethyleneoxide and propyleneoxide, and a compound of the formula, $$R_5 - Y \qquad (IX)$$

wherein $R_5$ is an alkyl group which may be substituted and Y is hydroxyl group, esters thereof or halogen atom.

The alkylating agents (IX) include methylchloride (or bromide), ethylchloride (or bromide), β-methoxy- or β-ethoxyethylchloride, β-chloroethylmethane sulfonylamide and hydroxylmethylmethane sulfonylamide.

When the alkylating agents of formula (IX) are used, the reaction temperature is usually 50° to 200°C., preferably 100° to 150°C., and the reaction time is usually 5 to 20 hours and in most cases the reaction is completed within about 10 hours. Inert solvents may be used as a reaction medium, however the compounds of formula (III) and (IX) themselves are preferably used as the solvent.

The reaction pressure is satisfactorily an atmospheric pressure, and in some cases any low pressure up to 10 kg./cm.² may be optionally selected. The two materials of the reaction may be used in a substantially stoichiometric ratio, however either of the two may be used in a small excess.

Catalysts which are used in the reaction include Lewis acids such as aluminum chloride, zinc chloride, ferric chloride and calcium chloride, Raney nickel, alumina, silica, sodium or potassium carbonate, sodium or potassium bicarbonate, sodium or potassium hydroxide, sodium methylate, and benzyltrimethylammonium hydroxide.

In the reaction the addition of a small amount of nitrobenzene, nitroalkylbenzene, or nitrobenzene sulfonic acid (including alkalimetal salts or ammonium salt thereof) can control the formation of undesirable by-products. The amount used is 0.1 to 10 percent by mole based on the compounds of formula (III).

When the alkylating agents are alkyleneoxides, the reaction is generally carried out in the absence of any solvent. In this case there may be used a catalysts such as water, mineral acids such as hydrochloric acid and sulfuric acid, and lower alkyl carboxylic acids such as acetic acid. The reaction temperature is usually 80° to 150°C., preferably 110° to 130°C., and the reaction pressure is an atmospheric pressure of 10 kg./cm.$^2$, preferably 3 to 7 kg./cm$^2$.

D. In the fourth embodiment of the invention nitroamine derivatives (II') are prepared by a new alkylation process, i.e, by the reaction between the compound (VI) and monoethanolamine.

In the reaction, the compounds of formula (VI) may be isolated from a reaction system in which they have been prepared, or not.

The reaction temperature is 30° to 200°C., preferably 60° to 170°C., and the reaction time is generally 3 to 12 hours.

The reaction medium is inert solvents such as hydrocarbons, halogenated compounds thereof, ethers, N,N-dimethylformamide, dimethylsulfoxide and N-methylpyrolidone, and the amount of the solvent used is 0.5 to 10 times by weight based on the total amount of the compound of formula (IV) and monoethanolamine. The process may be carried out without solvent.

The compounds of formula (VI) and monoethanolamine are generally used in a stoichiometric ratio, preferably a small excess of the compounds (VI).

The reaction can be carried out without a catalyst, however preferably with a catalyst, e.g., Lewis acid or Lewis base, of 0.05 to 10 percent by mole based on the compound of formula (VI).

Lewis acids include aluminum chloride, ferric chloride, zinc chloride, sulfuric acid, phosphoric acid, hydrochloric acid, benzene sulfonic acid, toluene sulfonic acid, methane sulfonic acid, acetic acid, halogenated acetic acid and propionic acid.

Lewis bases include hydroxides and oxides of alkali metal or alkaline earth metal, pyridine, picoline, N,N-disubstituted aniline, trimethylamine and triethanolamine. Monoethanolamine which is a material also acts catalytically as a Lewis base.

Furthermore metallic copper, cuprous salts or cupric salts can be used as a catalysts.

Thus, after completion of reaction, aimed products can be obtained in a high purity by a method including filtration, evaporation of solvent, extraction and recrystallization.

E. In the fifth embodiment of the invention, separation of the compounds of formula (II) wherein $R_5$ is a sufonylamidoalkyl group from the compounds of formula (III')

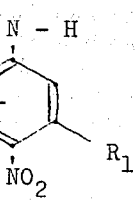

wherein $R_1$ and X are as defined above, and $R_3'$ is hydrogen atom or an alkyl group which may be substituted by hydroxy group or an alkoxy group.

The bases used herein are preferably alkali metal hydroxides, carbonates, bicarbonates, formates and acetates (referred to as "the first group" hereinafter); alkali metal alkoxides such as methoxides, ethoxides, propoxides and butoxides (referred to as "the second group" hereinafter); and organic bases such as pyridine, picoline, and trimethylbenzylammonium hydroxide (referred to as "the third group" hereinafter).

The purification and separation processes will be illustrated in more details.

The bases above mentioned are added to a mixture of the above-defined compounds of formula (II) and (III') in the presence or absence of a solvent. The amount of the base used is 1.0 to 10.0 times by mole based on the compounds (II), preferably 1.05 to 6.0 times by mole. The treating temperature is −10°C. to 150°C., and usually 0° to 80°C., and the treating time is 30 minutes to 2 hours.

The first group among the bases above mentioned are, in most cases, used in the form of aqueous solution. Since the compounds of formula (II) are made soluble in water through formation of an adduct with the bases, they are easily be separated from the compounds of formula (III). The compounds (II) dissolved in the aqueous solution can be separated therefrom as precipitates completely free from the compounds of formula (III') by dilution with water or neutralization.

The second group is preferably used as it is or as a solution thereof in the corresponding alcohols. The resulting adducts between the compounds of formula (II) and the bases are crystals which are then filtered and neutralized to give high-purity compounds of formula (II).

The third group may be used by any one of the processes by which the first and second groups are used, according to the reaction conditions. And the separation in each case is very easy and satisfactory.

The process described above consists of simple unit operations such as separation and filtration, and so there is substantially no loss in the compounds of formula (II) and (III') at all. Furthermore, the compounds (II) has an extremely high purity and the compounds (III') can be reused in the next reaction without any further treatment. Consequently the separation process of the invention can be said such superior to the conventional crystallization method because of the highly simplified operation and the increaased recovery of the compounds of formula (II) and (III').

In addition, it is a surprising fact that —CH$_2$NHSO$_2$— group in the compounds of formula (II) is not decomposed at all in the presence of the bases.

F. In the sixth embodiment of the invention, the compounds of formula (I) can be obtained by reducing the compounds of formula (II) which are prepared directly from the compounds of formula (IV) or indirectly via the compounds of formula (III).

The reduction may be carried out by a common process, e.g., a reduction with iron, however preferably by a catalytic hydrogenation process using an activated metal catalyst, taking into account the yield and purity of products and the reaction operation.

The catalyst include (1) Raney type metal catalysts such as Raney nickel, Raney copper and Raney iron; (2) noble metal catalysts supported by a suitable carrier, for example, palladium, rhodium, rubidium or platinum supported by carbon, alumina, silica or barium sulfate; (3) other metal catalysts such as stabilized Raney nickel and copper chromate; preferably Raney nickels, platinum, palladium or copper chromate may be used. The amount of the catalyst is 0.5 to 5 % by weight based on the nitroamine compound (II).

The reaction medium preferably is water, methanol, ethanol, n- or iso-propanol, dioxane, or dipropylether. The amount used is 0.5 to 5 times by weight based on the compounds of formula (II), and the reaction pressure, i.e., hydrogen pressure, may be an atmospheric one or more, usually preferably 5 to 100 kg./cm.$^2$ in order to promote the reaction. The reaction temperature is 50° to 200°C., preferably 70° to 150°C., and the reaction time is satisfactorily 3 to 12 hours.

According to the reduction under these conditions, the compounds of formula (II) can be converted into the compounds of formula (I) substantially quantitatively without the formation of any by-product.

After completion of the reaction, the catalyst is recovered by filtration and reused. Aimed products are obtained in the form of a free amine by distillating the reaction mixture to remove a solvent, or in the form of a salt by adding hydrochloric acid or sulfuric acid.

The compounds of formula (I) thus obtained are highly pure as they contain substantially no by-product.

The method for preparing the compunds of formula (I) according to the present invention is characterized in that the yield of each process is very high whereby the overall yield from starting materials to aimed products is also very high and the products obtained have a very high purity, and that the intermediate products at each process are very stable and easy to be handled.

The present invention will be illustrated with reference to the following Examples which are only illustrative but not limitative thereto.

EXAMPLE 1

To a mixture of 15 parts of water and 15 parts of ethanol were added 10 parts of 3-methyl-4-nitrophenol, and equimolar amount of sodium hydroxide and 0.1 percent by mole of sodium iodide based on 3-methyl-4-nitrophenol, and a required amount of ethylchloride was passed through the mixture at 120° to 125°C. Ethylchloride of 1.1 times by moles based on 3-methyl-4-nitrophenol was introduced over 8 hours. The reaction produce was further maintained at 120° to 125°C. for 3 hours, distilled to remove alcohol, and the residual solution was extracted with benzene and treated by a usual manner to give 1-ethoxy-3-methyl-4-nitrobenzene in a yield of 99 percent. The resulting compound, when recrystallized from a water-alcohol solution, gave m.p. of 54° – 55°C. The structure was identified by an elementary analysis, infra-red absorption spectrum, mass spectrum and NMR spectrum.

The same results were also obtained when 3,5-dimethyl-4-nitrophenol which was prepared from 3,5-dimethylphenol by nitration of phosphate thereof followed by hydrolysis, or 3-methyl-4-nitro-5-methoxyphenol which was prepared from 3-methyl-5-methoxyphenol according to the same process as in the former compound, were used in place of 3-methyl-4-nitrophenol.

Sodium hydroxide may be replaced by an equimolar amount of sodium carbonate or potassium hydroxide.

The replacement of ethylchloride by methylchloride, n-propylchloride or isopropylchloride gave the corresponding ether in a yield of above 95 percent in each case.

Furthermore, a mixture of ethanol and water may be replaced by methanol, n-propylalcohol or isopropylalcohol alone or a combination thereof with water.

EXAMPLE 2

1 Mole of 3-methyl-4-nitroanisole and a 20 percent aqueous solution of 15.0 mol of ethylamine were added to stainless steel autoclave, and then the mixture was maintained at 180°C. for 10 hours while stirring. The pressure was 25 to 30 kg./cm$^2$. The resulting reaction mixture was cooled and filtered to separate crystals. The aqueous layer was distilled to remove ethylamine and the residual solution was extracted with n-butanol. The extract combined with the former crystals was dried and distilled to remove the solvent.

3-Methyl-4-nitro-N-ethylaniline was obtained in a selectivity of 97 percent, and a conversion of 93 percent. Simultaneous formation of a small amount of 3-methyl-4-nitrophenol was observed.

The melting point of the resulting 3-methyl-4-nitro-N-ethylaniline was 57° – 58°C.

| | | Found | Calculated |
|---|---|---|---|
| Elementary analysis | C (%) | 59.68 | 59.99 |
| | H (%) | 7.01 | 6.71 |

The same results were also obtained when monomethylamine, mono-n-propylamine, or diethalamine was used in place of ethylamine.

| | Selectivity | m.p. |
|---|---|---|
| N-methyl-3-methyl-4-nitroaniline | 94 % | 76 – 77°C. |
| N-n-propyl-3-methyl-4-nitroaniline | 92.5 % | 49 – 50°C. |

In those cases, the addition of 0.05 to 0.2 mole of sodium hydroxide or benzyltrimethylammonium hydroxide gave the similar results at a reaction temperature as low as 135° to 140°C. and for a reaction time as less as 5 to 6 hours.

Furthermore, similar results were also obtained under a reaction condition at 160°C. for 7 hours when water was replaced by a mixture of the same amounts of water and iso-butanol.

EXAMPLE 3

A mixture of 1 mole of 3-methyl-4-nitro-0-isopropylphenol and 13.0 mole of monoethanolamine was maintained at 210° to 220°C. for 12 hours. A pressure was 7 to 12 kg./cm$^2$ After completion of the reaction, an excess of ethanolamine was distilled off. Crude N-($\beta$-hydroxyethyl)-3-methyl-4-nitroaniline was obtained in a selectivity of 97.5 percent and a conversion of 60 percent. When recrystallized from an ethanol-water solution, the compound was obtained in a selectivity of 89 percent (m.p. 63° – 65.5°C.).

The structure was identified by elementary analysis, infra-red absorbtion spectrum and mass spectrum.

In the Example, when monoethanolamine was replaced by N-ethyl-ethanolamine, N-ethyl-N-($\beta$-hydroxyethyl)-3-methyl-4-nitroaniline was obtained in a selectivity of 90 percent and a conversion of 54 percent. m.p. 50° – 51°C.

EXAMPLE 4

To a mixture of 1 mole of 3-methyl-4-nitrophenetole and 10 moles of N-ethyl-N-(β-methylsulfonylaminoethyl)-amine which was prepared from 2-chloroethyl-methanesulfonylamide and a large excess of ethylamine, were added N,N-dimethylformamide of 15 times by weight of 3-methyl-4-nitrophenetole, and then the mixture was maintained at 190°C. for 10 hours. After completion of the reaction, the reaction mixture was distilled to remove low-boiling matters and the residue was added to an aqueous sodium hydroxide solution at 0°C. and extracted with toluene. 42 percent of 3-methyl-4-nitrophenetole were transferred to the toluene layer and recovered as an unreacted material. The aqueous layer was neutralized, and the resulting precipitates were crystallized from an ethanol-water solution.

N-ethyl-N-(β-methylsulfonylaminoethyl)-3-methyl-4-nitroaniline was obtained in a selectivity of 84 percent from the reacted 3-methyl-4-nitrophenetole. m.p. 106° – 107°C.

The structure was identified by elementary analysis and mass spectrum.

The same results were obtained from N-ethyl-N-(β-methoxy)ethylamine and 3-methyl-4-nitrophenetole by the same way as described above.

EXAMPLE 5

1.0 mole of β-hydroxyethylmethanesulfonylamide, 1.0 mole of N-ethyl-3-methyl-4-nitroaniline and developed Raney nickel of 5 percent by weight based on the latter compound were mixed together and the mixture was maintained at 175° to 185°C. for 9 hours in an atmosphere of nitrogen. After cooling, isobutanol was added to the reaction product which was then clarified with active carbon to give N-ethyl-N-(β-methylsulfonylaminoethyl)-3-methyl-4-nitroaniline (m.p. 106° – 107°C.) in a yield of 63 percent.

The structure was identified by infra-red absorption spectrum.

EXAMPLE 6

1.0 Mole of 3-hydroxypropylmethanesulfonylamide which was prepared from 3-hydroxypropylamine and methanesulfonylchloride by a usual manner, and 1.0 mole of sulfur trioxide were added to ethylenedichloride of 20 times by weight based on the total amounts of the former two compounds, and the mixture was reacted at 0°C. A half ester of sulfuric acid was obtained as a syrup which was used in the subsequent process as it is.

To the total amount of the syrup was added 1.02 moles of N-methyl-3-methyl-4-nitroaniline, and the mixture was heated to 60°C. to which 1.2 moles of potassium bicarbonate was added over 2 hours. The resulting mixture was maintained at 100°C. for 6 hours, filtered and evaporated. To the residual solution was added methanol of 2 times by weight based on the solution, and the mixture was clarified with active carbon and then recrystallized.

N-methyl-N-(γ-methylsulfonylamino-n-propyl)-3-methyl-4-nitroaniline (m.p. 110° – 112°C.) was obtained in a selectivity of 92 percent. The structure was identified by elementary analysis and infra-red absorption spectrum.

In the Example, the replacement of 1.0 mole of sulfur trioxide by 0.5 mole of the compound gave almost the same result.

Furthermore, the same reaction as in Example was carried out except that phosphate was prepared at 150°C. by using ⅓ mole of phosphorus oxychloride in place of sulfur trioxide, and the same compound was obtained in a selectivity of 87 percent.

The same procedures were carried out in various combinations of compounds. The results are given in Table 1.

Table 1

| No. | Material | | Product | | Reaction temperature | Yield |
|---|---|---|---|---|---|---|
| | Preparation of the alkylating agent | | Nitro compound (III) | Nitroamine compound (II) | | |
| 6-4 | β-hydroxyethyl-ethane-sulfonyl-amide | esterification with 0.5 molar ratio of sulfurtrioxide | N-ethyl-3-methyl-4-nitroaniline | N-ethyl-N-(β-ethylsulfonyl-aminoethyl)-3-methyl-4-nitroaniline | 100°C. | 94 % |
| 6-5 | β-hydroxyethyl-methane-sulfonylamide | same as above | same as above | N-ethyl-N-(β-methylsulfonyl-aminoethyl)-3-methyl-4-nitroaniline | 100°C. | 86.2 % |
| 6-6 | same as above | esterification with 1.0 molar ratio of sulfurtrioxide | same as above | same as above | 90°C. | 93 % |
| 6-7 | same as above | esterification with ⅓ molar ratio of phosphorusoxychloride | same as above | same as above | 120°C. | 87 % |
| 6-8 | hydroxymethyl-methane sulfonylamide | esterification with 0.5 molar ratio of sulfurtrioxide | N-methyl-3-methyl-4-nitroaniline | N-methyl-N-(methylsulfonyl-aminomethyl)-3-methyl-4-nitroaniline | 110°C. | 72 % |

EXAMPLE 7

1.0 Mole of β-hydroxyethylmethanesulfonylamide and ⅓ mole of boric acid were subjected to a dehydration reaction at a temperature up to 145°C. in a solvent of xylene. Then borate was obtained in a glutinous form.

To the borate was added 1.0 mole of 3,5-dimethyl-4-nitroaniline and then 1.1 moles of potassium hydroxide was further added at 50°C. The mixture was slowly heated and maintained at 130°C. for 7 hours. Then the rection mixture was filtered, evaporated and treated as described above to give N-ethyl-N-(β-methylsulfonylaminoethyl)-3,5-dimethyl-4-nitroaniline in a selectivity of 70 percent.

EXAMPLE 8

Various esters were prepared from 0.1 mole of β-hydroxyethylmethane sulfonylamide by the procedures as described in Table 2.

Crude products of the esters thus obtained were each subjected to the similar reaction as described in Example 7. Yields obtained were 83, 83, 67 and 88 percent in the order of experimental number in Table 2.

lowed the reaction to reach the end under a reaction at 120°C. for 10 hours.

The reaction was carried out using iodine or potassium iodide of 0.2 percent by weight based on N-ethyl-3-methyl-4-nitraniline under the conditions as shown in Table 3.

Table 3

| No. | Alkylating agent | Nitro compound (III) | Reaction Temperature (°C.) | Time (hr.) | Product Nitroamine compound (II) | Yield (%) | Remark |
|---|---|---|---|---|---|---|---|
| 9-3 | 3-chloropropylmethane sulfonylamide* | N-methyl-3-methyl-4-nitroaniline | 130 | 12 | N-methyl-N-(γ-methylsulfonylaminopropyl)-3-methyl-4-nitroaniline | 78 | KI used |
| 9-4 | 2-chloroethylmethane sulfonylamide | N-(β-hydroxyethyl)-3-methyl-4-nitroaniline | 125 – 135 | 10 | N-(β-hydroxyethyl)-N-(β-methylsulfonylaminoethyl)-3-methyl-4-nitroaniline | 63 | KI used |
| 9-4 | same as above | N-(β-methylsulfonylaminoethyl)-3-methyl-4-nitroaniline | 155 | 12 | N,N-bis(β-methylsulfonylaminoethyl)-3-methyl-4-nitroaniline | 86 | KI used |

*The compound was prepared from 3-hydroxypropylmethanesulfonylamide and thinylchloride by a usual manner.

Table 2

| No. | Esterifying agents | | Reaction | | Product | | |
| | Name | Mole | Temperature (°C.) | Time (hr.) | Name | Yield (%) | Remark |
|---|---|---|---|---|---|---|---|
| 8-1 | thionylchloride | ⅓ | 30 | 2 | sulfite dichlorophosphite | quantitative | glutinous pyridine |
| 8-2 | phosphorus trichloride | 1.0 | 80 | 5 | | quantitative | catalyst used syrup |
| 8-3 | nitric acid | 1.05 | 10 | 1.5 | nitrate | 70 | urea used glutinous pyridine |
| 8-4 | nitrosylchloride | 1.0 | 15 | 0.5 | nitrate | above 95 | catalyst used syrup |

EXAMPLE 9

A mixture of 1.05 moles of β-chloroethylmethanesulfonylamide, 1.0 mole of N-ethyl-3-methyl-4-nitroaniline, and 1.10 moles of potassium bicarbonate was maintained at 140°C. for 8 hours. To the reaction solution was added isopropylalcohol of 3.0 times by weight based on the thereoretical yield of an aimed product, and the mixture was filtered, and then the filtrate was cooled to precipitate crystals. N-ethyl-N-(β-methylsulfonylaminoethyl)-3-methyl-4-nitroaniline was obtained in a selectivity of 94 percent. m.p. 101° – 107.5°C.

In the reaction, it was found that an addition of 0.01 mole of sodium, potassium or ammonium m-nitrobenzene sulfonate could reduce the amount of impurities to a half to one-third.

Furthermore, an addition of iodine of 0.2 percent by weight based on N-ethyl-3-methyl-4-nitroaniline al-

EXAMPLE 10

To a mixture of 1.00 mole of N-ethyl-N-(β-methylsulfonylaminoethyl)-3-methyl-4-nitroaniline (referred to as II-10 hereinafter) and 0.30 mole of N-ethyl-3-methyl-4-nitroaniline (referred to as III-10 hereinafter), was added toluene of the same amount as that of the mixture, and then to the resulting solution was added an 8.0 percent aqueous solution of 2.5 moles of sodium hydroxide at 15° to 20°C. The solution was maintained at the same temperature for 1 hour and allowed to stand to separate into two phases. The aqueous layer was neutralized with hydrochloric acid to precipitate crystals which were then filtered at 20°C., washed with water and dried. 0.965 Mole of II-10 was obtained. II-10 was not contaminated with III-10. The toluene layer contained 0.30 mole of III-10 and 0.035 mole of II-10 which could be reused in the next reaction without causing any trouble.

In the reaction, replacement of the sodium hydroxide by potassium hydroxide gave the same result. In addition, replacement of sodium hydroxide by sodium carbonate also gave the similar result, however in this case a treating temperature was preferably 75° to 80°C.

In those cases, the similar results were obtained by replacing toluene by other hydrocarbons or chlorinated hydrocarbons.

Furthermore, when the same procedure was carried out in the same way as described above, except that II-10 alone was replaced by N-ethyl-N-(β-methylsulfonylaminoethyl)-3,5-dimethyl-4-nitroaniline or N-ethyl-N-(γ-methylsulfonylaminopropyl)-3-methoxy-4-nitroaniline, the purified product was obtained in a yield of above 95 percent.

REFERENCE

A mixture of 1.00 mole of II-10 and 0.30 mole of III-10 was recrystallized repeatedly from methanol of 2 times by weight based on the mixture.

The purity and yield of II-10 against the frequency of recrystallization are given in the following Table.

| Frequency of recrystallization | Purity (%) | Yield (%) |
| --- | --- | --- |
| 0 | 76.9 | 100 |
| 1 | 89.4 | 78 |
| 2 | 96.2 | 86 |
| 3 | 98.0 | 92 |
| 4 | >99 | 94 |
|  |  | Overall yield 58 |

EXAMPLE 11

A mixture of 101 moles of N-ethyl-3-methyl-4-nitroaniline and 103 moles of methanesulfonylchloride was maintained at 150°C. for 2 hours. N-ethyl-N-methanesulfonyl-3-methyl-4-nitroaniline was obtained under generation of hydrochloric acid gas. The reaction mixture was used in the subsequent process as it is.

To the resulting mixture were added 1.0 mole of monoethanolamine and methane sulfonic acid of 0.1 percent by mole based on monoethanolamine, and the mixture was maintained at 145° – 150°C. for 5 hours. Then isopropylalcohol and active carbon were added to the reaction solution which was then heated and filtered. The filtrate was cooled to precipitate crystals. The crystals, N-ethyl-N-(β-methylsulfonylaminoethyl)-3-methyl-4-nitroaniline (m.p. 106° – 107°C.), were obtained in a selectivity of 90 percent. The compound showed the same infra-red absorption spectrum as that of previously prepared authentic sample.

EXAMPLE 12

The reaction was carried out in the same way as in Example 11, except that pyridine was used in place of methane sulfonic acid and that N,N-dimethylformamide of 5 times by weight based on monoethanolamine was used. The reaction was carried out at 110° – 120°C. for 4 hours. The selectivity was 85 – 90 percent.

EXAMPLE 13

To an autoclave were added 1.00 mole of N-ethyl-N-(β-methylsulfonylaminoethyl)-3-methyl-4-nitroaniline (referred to as II-1 hereinafter), methanol of 2.0 times by weight of II-1, and 5 percent palladium on carbon of 0.5 percent by weight based on II-1. The mixture was reacted at 150°C. under a hydrogen pressure of 30 kg./cm². Hydrogen gas was absorbed quantitatively after 6 hours. The reaction mixture was cooled and an excess of hydrogen was discharged.

Then the catalyst was collected by filtration. The recovered catalyst can be reused in the next reaction by an addition of the amount lost. The filtrate thus obtained was divided into two, and each portion was treated as follows.

1. One half of the filtrate was distilled to remove methanol to give 0.495 mole of high-purity N-ethyl-N-(β-methylsulfonylaminoethyl)-3-methyl-4-aminoaniline (referred to as I-13) hereinafter) was obtained. A selectivity was 99 percent.

2. To another half of the filtrate was added at 0°C. 0.75 mole of 98 percent sulfuric acid and the resulting mixture was distilled to remove methanol. 0.492 Mole of sesquisulfate monohydrate of I-13 was obtained. m.p. about 135°C. Yield 98.4 percent.

In the reaction, the good results were obtained by the same way as described above, except that N-ethyl-N-(β-hydroxyethyl)-3-methyl-4-nitroaniline, N,N-diethyl-3-methyl-4-nitroaniline, or N-ethyl-N-(β-methoxyethyl)-3-ethyl-4-nitroaniline or N-ethyl-N-(β-methoxyethyl)-3-methyl-4-nitroaniline was used in place of II-13.

REFERENCE 1.00 Mole of N-ethyl-N-(β-methylsulfonylaminoethyl)-3-methyl-4-nitrosoaniline was hydrogenated according to the above Example. An upper limit of the reaction temperature was 90°C. and at temperature above 90°C. black resinous matters were produced. In order to obtain the same rate of reaction as in Example, under a condition of 90°C. × 30 kg./cm²., the amount of 5 percent palladium on carbon was more than 1.5 percent by weight based on the nitroso compound.

EXAMPLE 14

To an autoclave were added 1.50 moles of N-ethyl-N-(β-methylsulfonylaminoethyl)-3,5-dimethyl-4-nitroaniline (referred to as II-14 hereinafter), isopropanol of 3.0 times by weight based on II-14, and Raney nickel (W-6 development) of 3.5 percent by weight based on II-2, and the mixture was reacted at 165° to 170°C. under a hydrogen pressure of 15 kg./cm². After 6 hours, II-14 in the reaction system disappeared. 0.50 mole of sulfuric acid was added to the reaction mixture which was then distilled to remove isopropanol. 1.46 Moles of sulfuric half salt of N-ethyl-N-(β-methylsulfonylaminoethyl)-3,5-dimethyl-4-aminoaniline (m.p. above 148°C.) was obtained.

Replacement of II-14 by N-ethyl-N-(β-ethoxyethyl)-3-methyl-4-nitroaniline, N-methyl-N-(β-methylsulfonylaminoethyl)-3,5-dimethyl-4-nitroaniline or N-ethyl-N-(β-hydroxyethyl)-3-ethyl-4-nitroaniline gave also a smooth reaction and a good yield.

Reference

When N-ethyl-N-(β-methylsulfonylaminoethyl)-3,5-dimethyl-4-nitrosoaniline was used in place of II-14, an upper limit of the reaction temperature was about 85°C. Therefore Raney nickel of above 5.2 percent by weight based on the nitroso compound was required and even under this condition certain amount of black resinous matter was produced.

EXAMPLE 15

To a stainless steel autoclave, were added 1.0 mole of 3-methyl-4-nitrophenol (V-15), 1.1 moles of ethylchloride, 1.11 moles of sodium hydroxide, and water and isopropylalcohol each of the same amount as that of V-15, and then the mixture was reacted at 150°C. for 5 hours under a pressure of 15 kg./cm². After completion of the reaction, isopropylalcohol was distilled off and the residual solution was treated in a usual manner to give 1-ethoxy-3-methyl-4-nitrobenzene (IV-15) in a yield of above 98 percent. b.p. 125° – 135°C./1 mmHg. m.p. 55.5°C.

Then, 1.0 mole of IV-15, 10.0 moles of ethylamine, water of 5 times by weight based on IV-15, and 0.05 mole of sodium hydroxide were mixed, and the mixture was reacted at 155° – 160°C. for 15 hours under a pressure of 18 kg./cm². Low-boiling matters were recovered from the reaction mixture which was then separated and distilled. 0.15 mole of IV-15 which is one of materials, and 0.83 mole of N-ethyl-3-methyl-4-nitroaniline (III-15, b.p. 165° – 175°C./1 mmHg.) were obtained. The conversion was 85 percent, and the selectivity was 98 percent. To 1.0 mole of III-15 were added 1.0 mole of β-chloroethylmethane sulfonylamide and 0.50 mole of sodium carbonate, and the mixture was reacted at 130°C. for 15 hours while carbon dioxide and water were generated. After completion of the reaction, to the reaction solution were added benzene and water each of the same amount as that of the reaction mixture, and then the mixture was heated and separated.

The benzene layer was distilled to remove benzene and the resulting crude product was recrystallized from methanol of 3 times by weight based on the product. N-ethyl-N-(β-methanesulfonylaminoethyl)-3-methyl-4-nitroaniline (II-15, m.p. 106.5°C.) was obtained in a yield of 87 percent.

Next, a mixture of 1.00 part of IV-15, 5.0 parts of methanol and 0.0005 part of 10 percent palladium on carbon was hydrogenated at 140°C. for 10 hours under a hydrogen pressure of 20 kg./cm². Solid matters were filtered off from the reaction mixture which was then distilled to remove low-boiling matters.

N-ethyl-N-(β-methanesulfonylaminoethyl)-3-methyl-4-nitroaniline was obtained in a yield of 98 percent. The product gave a sesquisulfate monohydrate (m.p. 128° – 135°C.) quantitatively by treating with a calculated amount of sulfuric acid.

In the Example, the use of 3,5-dimethyl-4-nitrophenol in place of V-15 gave N-ethyl-N-(β-methanesulfonylaminoethyl)-3,5-dimethyl-4-aminonoaniline by the same procedure as above.

EXAMPLE 16

1.0 Mole of IV-15 prepared in Example 15, 6.8 moles of N-ethyl-N-(β-hydroxyethyl)-amine and 0.05 mole of benzyltrimethylammonium hydroxide were mixed, and the mixture was maintained at 120°C. for 6 hours. After recovery of unreacted IV-15, N-ethyl-N-(2-hydroxyethyl)-3-methyl-4-nitroaniline (II-16) was obtained in a selectivity of 94 percent based on the reacted IV-15.

Next, a mixture of 1 part of II-16, 3 parts of 95 percent ethanol and 0.04 part of Raney nickel was hydrogenated at 130°C. under a pressure of 50 kg/cm². The reaction product was treated in the same manner as in Example 15 to give N-ethyl-N-(β-hydroxyethyl)-3-methyl-4-nitroaniline in a yield of 99 percent. The product had the same infra-red absorption spectrum as that of an authentic sample.

EXAMPLE 17

A mixture of 1.0 mole of N-ethyl-3-methyl-4-nitroaniline, 1.3 moles of β-methoxyethylchloride, 1.05 moles of potassium carbonate and a small amount of potassium iodide, was maintained at 150°C. for 15 hours. Crude N-ethyl-N-(β-methoxyethyl)-3-methyl-4-nitroaniline (II-17) which was obtained by a usual manner from the reaction mixture, was recrystallized from methanol to give the purified product in a yield of 81 percent. Purified II-17 was hydrogenated in the presence of palladium on carbon by the same manner as in Example 15 to give N-ethyl-N-(β-methoxyethyl)-3-methyl-4-aminoaniline in a yield of 99 percent. The product had the same infra-red absorption spectrum as that of an authentic sample. The product gave a sulfuric acid salt with an equimolar amount of sulfuric acid.

EXAMPLE 18

To an autoclave were added 1.0 mole of IV-15 prepared in Example 15, 10.0 moles of diethylamine and water of 5 times by weight based on IV-15, and the mixture was maintained at 195° – 200°C. for 15 hours. The conversion of IV-15 was 82 percent and N,N-diethyl-3-methyl-4-nitroaniline (II-18) was obtained in a selectivity of 94 percent. II-18 was hydrogenated in the presence of palladium on carbon catalyst in the same way as in Example 15. The temperature was 150°C. and the pressure was 30 kg./cm². N,N-diethyl-3-methyl-4-amineaniline was obtained approximately quantitatively.

The product gave a monohydrochloric acid salt (m.p. above 245°C.) with an equimolar amount of hydrochloric acid.

EXAMPLE 19

1.0 Mole of III-15 prepared in Example 15, 1.05 moles of ethyleneoxide and 0.010 mole of acetic acid were reacted at 110° to 113°C. in the presence of water. N-Ethyl-N-(β-hydroxyethyl)-3-methyl-4-nitroaniline was obtained in a selectivity of 96 percent.

EXAMPLE 20

1.0 Mole of 3,5-dimethyl-4-nitrophenol (V-20), 1.1 moles of ethylchloride, and 1.15 moles of potassium hydroxide were reacted at 140°C. for 5 hours in a mixed solvent of water and isobutanol. 1-Ethoxy-3,5-dimethyl-4-nitrobenzene (V-20) was obtained in a usual manner in a selectively of 93 percent.

V-20 was aminated with ethylamine in the same manner as in Example 15 to give N-ethyl-3,5-dimethyl-4-nitroaniline (III-20) in a selectivity of 91 percent. III-20 was reacted with N-(β-chloroethyl)-methanesulfonylamide in the same manner as in Example 15 to give N-ethyl-N-(β-methylsulfonylaminoethyl)-3,5-dimethyl-4-nitroaniline (II-20) in a selectivity of 86 percent.

Then II-20 was reduced in the presence of Raney nickel catalyst in the same manner as in Example 16 to give N-ethyl-N-(β-methylsulfonylaminoethyl)-3,5-dimethyl-4-aminoaniline approximately quantitatively.

What we claim is:

1. A process for the preparation of a diamino compound of the formula (I),

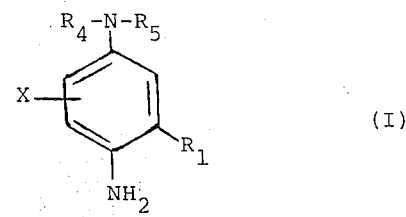

(I)

wherein $R_1$ is hydrogen, or a straight or branched $C_1$–$C_6$ alkyl, $R_4$ and $R_5$ are each $C_1$–$C_6$ alkyl unsubstituted or substituted by hydroxy, $C_1$–$C_3$ alkoxy, or a sulfonylamide of the formula, —NHSO$_2$— R$_{10}$ in which R$_{10}$ is C$_1$–C$_3$ alkyl, and X is hydrogen, chlorine, a bromine, C$_1$–C$_6$ alkyl or C$_1$–C$_3$ alkoxy, which comprises reacting a nitroether compound of the formula (IV),

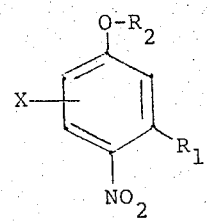

wherein R$_1$ and X are as defined above, and R$_2$ is C$_1$–C$_6$ alkyl or benzyl, with ammonia or an aliphatic primary amine of the formula, R$_6$—NH$_2$ in which R$_6$ is C$_1$–C$_6$ alkyl unsubstituted or substituted by hydroxy, C$_1$–C$_3$ alkoxy or the sulfonylamide group defined above, to prepare a nitro compound of the formula (III),

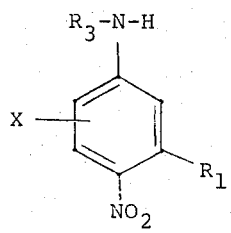

wherein R$_1$ and X are as defined above, and R$_3$ is hydrogen, C$_1$–C$_6$ alkyl unsubstituted or substituted by hydroxyl, C$_1$–C$_3$ alkoxy or the sulfonylamide group defined above, and successively reacting the nitro compound (III) with an alkylating agent selected from the group consisting of C$_1$–C$_6$ alkyleneoxides and compounds of the formula, R$_5$—Y in which R$_5$ is the same as defined above, and Y is hydroxyl, esters thereof, or a halogen atom, to prepare a nitroamine compound of the formula (II),

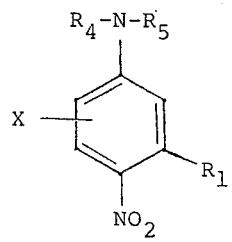

wherein R$_1$, R$_4$, R$_5$ and X are as defined above, and reducing the nitroamine compound (II) with a reducing agent to produce the objective compound (I).

2. A process for the preparation of a diamino compound of the formula (I),

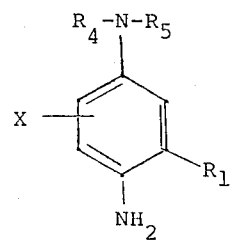

wherein R$_1$ is hydrogen or a straight or branched C$_1$–C$_6$ alkyl, R$_4$ and R$_5$ are each C$_1$–C$_6$ alkyl unsubstituted or substituted by hydroxy, C$_1$–C$_3$ alkoxy, or a sulfonylamide of the formula, —NHSO$_2$—R$_{10}$ in which R$_{10}$ is C$_1$–C$_3$ alkyl, and X is hydrogen, chlorine, a bromine atom, C$_1$–C$_6$ alkyl or C$_1$–C$_3$ alkoxy which comprises reacting a nitroether compound of the formula (IV),

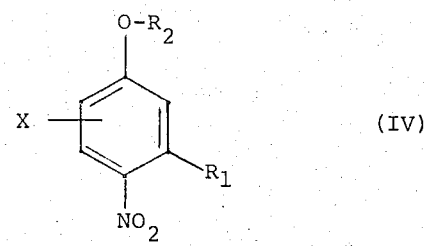

wherein R$_1$ and X are as defined above, and R$_2$ is C$_1$–C$_6$ alkyl or benzyl, with an aliphatic secondary amine of the formula

wherein R$_7$ and R$_8$ are each C$_1$–C$_6$ alkyl unsubstituted or substituted by hydroxy, C$_1$–C$_3$ alkoxy or the sulfonylamide group defined above, to prepare a nitroamine of the formula (II),

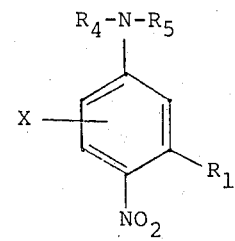

wherein R$_1$, R$_4$, R$_5$ and X are as defined above and reducing the nitroamine compound (II) with a reducing agent to produce the objective diamino compound (I).

3. A process for the preparation of a diamino compound of the formula (I),

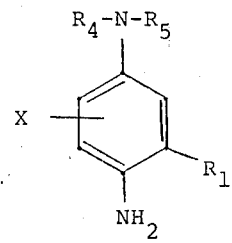

wherein R$_1$ is hydrogen, or a straight or branched C$_1$–C$_6$ alkyl, R$_4$ and R$_5$ are each C$_1$–C$_6$ alkyl unsubstituted or substituted by hydroxy, C$_1$–C$_3$ alkoxy, or a sulfonylamide of the formula, —NHSO$_2$—R$_{10}$ in which R$_{10}$ is C$_1$–C$_3$ alkyl, and X is hydrogen, chlorine, a bromine, $C_1-C_6$ alkyl or $C_1-C_3$ alkoxy, which comprises (1) reacting a nitrophenol compound of the formula (V),

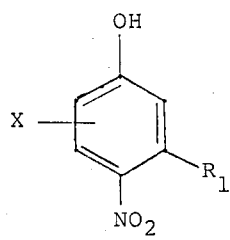

wherein $R_1$ and X are as defined above, with a chloride compound of the formula, $R_2-Cl$ wherein $R_2$ is a $C_1-C_6$ alkyl or benzyl, to prepare a nitroether compound of the formula (IV),

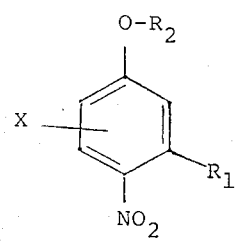

wherein $R_1$, $R_2$ and X are as defined above, (2a) reacting the nitroether compound (IV) with ammonia or an aliphatic primary amine of the formula $R_6-NH_2$ in which $R_6$ is $C_1-C_6$ alkyl unsubstituted or substituted by hydroxy, $C_1-C_3$ alkoxy or the sulfonylamide group defined above to prepare a nitro compound of the formula (III),

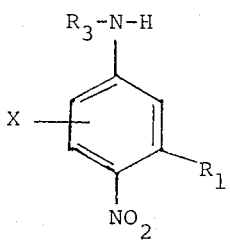

wherein $R_1$ and X are as defined above and $R_3$ is hydrogen, $C_1-C_6$ alkyl unsubstituted or substituted by hydroxyl, $C_1-C_3$ alkoxy or the sulfonylamide group defined above and successively reacting the nitro compound (III) with an alkylating agent selected from the group consisting of $C_1-C_6$ alkyleneoxides and compounds of the formula $R_5-Y$ in which $R_5$ is the same as defined above and Y is hydroxyl, esters thereof, or a halogen atom, to prepare a nitroamine compound of the formula (II),

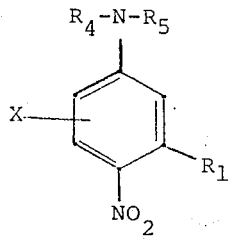

wherein $R_1$, $R_4$, $R_5$ and X are as defined above, or (b) reacting the nitroether compound (IV) with an aliphatic secondary amine of the formula

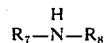

wherein $R_7$ and $R_8$ are each $C_1-C_6$ alkyl unsubstituted or substituted by hydroxy, $C_1-C_3$ alkoxy or the sulfonylamide group defined above to prepare a nitroamine compound II, and (3) reducing the nitroamine (II) with a reducing agent to prepare the diamine compound (I), 4. The process accordng to claim 1, wherein a nitroamine compound having a B-$C_1-C_3$ alkylsulfonylamidoethyl group.

5. The process according to claim 1, wherein a nitroamine compound having a $C_1-C_3$-alkylsulfonylamido-$C_1-C_6$ alkyl group as $R_5$ in formula (II), is prepared by reacting a nitro compound of the formula (III'),

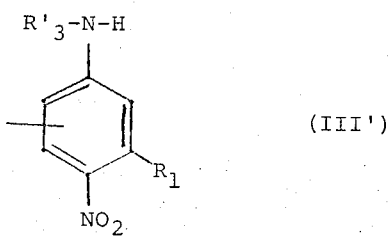

wherein $R_1$ and X are the same as defined in claim 19, and $R'_3$ is hydrogen or a $C_1-C_6$ alkyl group which may be substituted by hydroxy or $C_1-C_3$ alkoxy with an alkylating agent as defined in claim 19, to obtain a reaction mixture containing the above-defined nitroamine compound and the unreacted nitro compound (III'), by treating said reaction mixture with an inorganic or organic base to separate the above-defined nitroamine compound from the unreacted nitro compound (III'). as $R_5$ in the formula (II), is prepared by reacting a sulfonylamide of the formula (VI),

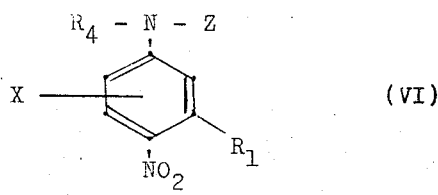

wherein $R_1$, $R_4$ and X are as defined in claim 1, and Z is an alkysulfonyl group, with monoethanolamine.

6. The process according to claim 1, wherein the reduction is carried out in the presence of an activated metal catalyst with hydrogen.

7. The process according to claim 6, wherein the activated metal catalyst is Raney nickel, stabilized Raney nickel, platinum or palladium which may be supported on a carrier, or copper chromate.

8. The process according to claim 1, wherein the reduction is carried out at a temperature within a range of from room temperature to 200°C. under a pressure within a range of from an atmospheric pressure to 100 kg./cm².

9. The process according to claim 1, wherein the reaction between the nitroether compound (IV) and ammonia or the aliphatic primary amine is carried out at a temperature of 50° to 250°C. under a pressure of atmospheric pressure to 100 kg./cm².

10. The process according to claim 1, wherein the alkylation is carried out at a temperature of 50 to 200 C. under a pressure of atmospheric pressure to 10 kg./cm².

11. The process according to claim 2, wherein the reaction between the nitroether compound (IV) and the aliphatic secondary amine is carried out at a temperature of 30° to 300°C. under a pressure of atmospheric pressure to 100 kg./cm².

12. The process according to claim 3, wherein the chloride is methyl chloride, ethyl chloride, n- or isopropyl chloride, n-, sec- or tert.-butyl chloride, n-hexyl chloride or benzyl chloride.

13. The process according to claim 3, wherein the reaction between the nitrophenol compound (V) and the chloride is carried out at a temperature of 50° to 250°C. under a pressure of atmospheric pressure to 20 kg./cm².

14. The process according to claim 2, wherein the reduction is carried out in the presence of an activated metal catalyst with hydrogen.

15. The process according to claim 3, wherein the reduction is carried out in the presence of an activated metal catalyst with hydrogen.

16. The process according to claim 2, wherein the reduction is carried out at a temperature within a range of from room temperature to 200°C. under a pressure within a range of from an atmospheric pressure to 100 kg./cm².

17. The process according to claim 3, wherein the reduction is carried out at a temperature within a range of from room temperature to 200°C. under a pressure within a range of from an atmospheric pressure to 100 kg./cm².

18. The process according to claim 3, wherein the reaction between the nitroether compound (IV) and ammonia or the aliphatic primary amine is carried out at a temperature of 50° to 250°C. under a pressure of atmospheric pressure to 100 kg./cm².

19. The process according to claim 3, wherein the alkylation is carried out at a temperature of 50° to 200°C. under a pressure of atmospheric pressure to 10 kg./cm².

20. The process according to claim 3, wherein the reaction between the nitroether compund (IV) and the aliphatic secondary amine is carried out at a temperature of 30° to 300°C. under a pressure of atmospheric pressure to 100 kg./cm².

* * * * *